United States Patent [19]

Schiffman

[11] 4,183,758

[45] Jan. 15, 1980

[54] ZINC CHROMIUM CHROMATE PIGMENT

[76] Inventor: Louis Schiffman, 1837 Merritt Rd., Abington, Pa. 19001

[21] Appl. No.: 883,506

[22] Filed: Mar. 6, 1978

[51] Int. Cl.² ............................. C09D 5/08; C09C 1/04; C09C 1/34

[52] U.S. Cl. ............................. 106/14.05; 106/14.21; 106/14.39; 106/292; 106/302; 423/595; 423/622

[58] Field of Search ............... 106/14.05, 292, 302, 106/14.21, 14.39; 148/6.2; 423/595, 622

[56] References Cited

U.S. PATENT DOCUMENTS

| | | | |
|---|---|---|---|
| 2,387,528 | 10/1945 | Patterson et al. | 423/595 |
| 3,472,681 | 10/1969 | Schuster et al. | 148/6.2 |
| 3,477,881 | 11/1969 | Wada et al. | 148/6.2 |
| 3,501,352 | 3/1970 | Shah | 148/6.2 |
| 3,879,523 | 4/1922 | Miyata et al. | 423/595 |
| 3,909,313 | 9/1975 | Kato et al. | 148/6.2 |

*Primary Examiner*—Lorenzo B. Hayes
*Attorney, Agent, or Firm*—B. Max Klevit

[57] ABSTRACT

Zinc oxide is interacted with an aqueous solution containing a chromium chromate complex obtained through partial reduction of an aqueous solution of chromic acid with an organic reducing agent. The resulting product is dried and the residual solid ground to suitable size for use as a pigment.

10 Claims, No Drawings

ZINC CHROMIUM CHROMATE PIGMENT

BACKGROUND OF THE INVENTION

1. Field of the Invention

The present invention relates generally to the field of corrosion-inhibiting pigments and is particularly concerned with such pigments comprising both zinc and chromium in chemical combination.

2. Prior Art

Metal protective pigments have long been used as components of coating compositions applied to metallic surfaces. Certain of these pigments have been, at least partially, effective in providing a specific inhibiting or passivating action at the surface of the metal. Among the useful pigments in this category are red lead and certain chromium containing pigments.

Among the better known chromium-containing pigments suggested for use in metal protecting coatings are zinc yellow or so called "zinc chromate" and zinc tetroxy chromate. These, among other pigments, are described in Kirk-Othmer: Encyclopedia of Chemical Technology, 2d. ed., Vol. 5 at pages 507–510; and by V. H. Chalupski in the monograph appearing in UDY: Chemistry of Chromium and its Compounds, Vol. 1 (Rheinhold Publishing Co., 1956) beginning at Page 357, particularly at pages 375–381. A further modified method for preparing zinc yellow is described in U.S. Pat. No. 2,410,916.

Zinc chromates have been used for many years as corrosion-inhibitive pigments. These pigments are used in formulations of paint and coating systems to protect metals against corrosion. The zinc chromate pigment may be used with other pigments such as red lead and ferric oxide pigments and/or with pigment extenders which may be applied as metal primers, such as, for example, in structural steel priming, on ships, aircraft, automotive bodies, etc.

The "zinc chromate" in present commercial use, or zinc yellow pigment as it is referred to in the trade, is a basic potassium zinc chromate, stated to have the empirical formula $4ZnO.4CrO_3.K_2O.3H_2O$. It can be made by a variety of processes, all based on the reaction of zinc and chromate compounds in aqueous solution and in the presence of potassium salts. Thus, it may be prepared by the reaction of acidified zinc oxide with potassium dichromate. The procedure described in U.S. Pat. No. 2,410,916 involves precipitation of a zinc salt with a solution of a chromate in the presence of potassium ions and hydroxyl ions. Other procedures described in the literature include initial treatment of the zinc oxide with KOH to render it reactive, followed by addition of the chromate solution in the form of potassium tetrachromate, (Kirk-Othmer, op. cit., Vol. V, pages 509–510).

Another commercial process involves the dispersion of zinc oxide in water, adding thereto a solution of potassium dichromate following by hydrochloric acid. The reaction may be expressed by the following equation:

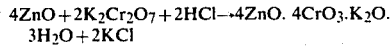

$4ZnO + 2K_2Cr_2O_7 + 2HCl \rightarrow 4ZnO.4CrO_3.K_2O.3H_2O + 2KCl$

Among other chromium pigments asserted to possess corrosion inhibitive properties are included chromates of alkaline earth metals and respectively of lead and iron, which pigments may also include alkali metal cation (potassium). A number of these have been exploited commercially to some extent.

In U.S. Pat. No. 2,387,528 there are described alkaline earth metal chromates containing trivalent as well as hexavalent chromium, such as basic calcium chromitochromate. These pigments, because of various drawbacks, have not attained commercial significance; UDY: op. cit. at page 381; Kirk-Othmer, op. cit. at page 510. These are prepared, according to the patent, by roasting a mixture of the alkaline earth metal chromate and an alkaline earth metal compound which is heat decomposable to the oxide, in designated proportions and grinding the resulting product.

Solutions of chromates have also been applied to metal surfaces or to "conversion coatings" on such metals to improve corrosion resistance and paint bonding characteristics. Thus, U.S. Pat. No. 2,902,394 describes metal protecting compositions for application to zinc surfaces, prepared by intimate admixture of chromic acid with aqueous nitric, sulfuric and acetic acids and with a sulfite-type reducing agent capable of reducing a minor portion of the hexavalent chromium to trivalent state.

An earlier patent of the present inventor, U.S. Pat. No. 3,063,877, describes aqueous solutions for treating metal surfaces to impart improved corrosion resistance, which solutions are prepared by partially reducing a dissolved hexavalent chromium compound with formaldehyde, under conditions such that at least 5% and preferably at least 20% of the total chromium is present in reduced state.

U.S. Pat. No. 3,279,958 describes rinsing of phosphate, chromate, and other chemical conversion coatings on metal surfaces with a dilute aqueous acidic solution of a chromium chromate complex, followed by a water rinse. The complex is prepared by treating aqueous chromic acid solution with an organic reducing agent which contains an active hydroxyl, aldehyde or carboxyl group, to reduce a portion of the hexavalent chromium to the trivalent state.

SUMMARY OF THE INVENTION

In accordance with the present invention, novel corrosion-inhibiting pigments are provided which comprise a complex of zinc associated with chromium, wherein the chromium is present in both trivalent and hexavalent state.

The novel pigments of the invention are produced by interaction of zinc oxide with a solution of a chromium chromate complex prepared by partial reduction of an aqueous solution of chromium trioxide with a soluble organic oxidizable compound containing an active hydroxyl, aldehyde or carboxyl group, followed by drying and grinding to desired pigment size particles.

The pigments thus obtained, when applied in conventional vehicles for coating metal surfaces, have a passivating effect on such surfaces and impart pronounced capacity for resisting corrosion.

DETAILED DESCRIPTION

A wide selection of oxidizable organic compounds is applicable for partial reduction of the chromic acid; e.g. formaldehyde, methanol, ethanol, citric acid, sucrose, furfural, etc. From the standpoint of convenience, economy, and performance, the preferred reducing agents are methanol, formaldehyde and furfural.

In a preferred procedure, the zinc oxide is dispersed in water or is made into an aqueous paste. A solution